United States Patent
Yamanaka

(10) Patent No.: US 9,479,098 B2
(45) Date of Patent: Oct. 25, 2016

(54) STEPPING MOTOR CONTROL DEVICE, OPTICAL APPARATUS, STEPPING MOTOR CONTROL METHOD, AND NON-TRANSITORY COMPUTER READABLE RECORDING MEDIUM

(71) Applicant: CANON KABUSHIKI KAISHA, Tokyo (JP)

(72) Inventor: Tomoaki Yamanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 14/333,270

(22) Filed: Jul. 16, 2014

(65) Prior Publication Data

US 2015/0022139 A1 Jan. 22, 2015

(30) Foreign Application Priority Data

Jul. 19, 2013 (JP) ................................. 2013-150765

(51) Int. Cl.
*H02P 8/00* (2006.01)
*G05B 19/40* (2006.01)
*H02P 8/14* (2006.01)
*H02P 8/22* (2006.01)

(52) U.S. Cl.
CPC .. *H02P 8/14* (2013.01); *H02P 8/22* (2013.01)

(58) Field of Classification Search
CPC .................................. H02P 8/14; H02P 8/22
See application file for complete search history.

(56) References Cited

U.S. PATENT DOCUMENTS

| 4,276,504 | A | 6/1981 | Nagase et al. | |
|---|---|---|---|---|
| 6,605,912 | B1 | 8/2003 | Bharadwaj | |
| 7,821,217 | B2 | 10/2010 | Abolhassani | |
| 2003/0178965 | A1* | 9/2003 | Kuwano | H02P 8/14 318/685 |
| 2010/0253265 | A1* | 10/2010 | Clothier | A47L 5/26 318/400.14 |
| 2012/0050897 | A1 | 3/2012 | Akada | |
| 2014/0049200 | A1* | 2/2014 | Ueyama | H02P 8/14 318/400.14 |

FOREIGN PATENT DOCUMENTS

| CN | 101388634 A | 3/2009 |
|---|---|---|
| CN | 102386825 A | 3/2012 |
| CN | 102460946 A | 5/2012 |
| DE | 2856538 A1 | 8/1979 |

(Continued)

OTHER PUBLICATIONS

Han Kong, Jinglin Liu, Guangzhao Cui, "Study on Field-weakening Theory of Brushless DC Motor Based on Phase Advance Method," 2010 International Conference on Measuring Technology and Mechatronics Automation, Mar. 14, 2010, pp. 583-586, vol. 3, IEEE Computer Society, USA.

*Primary Examiner* — Bentsu Ro
*Assistant Examiner* — Zemenay Truneh
(74) *Attorney, Agent, or Firm* — Canon USA, Inc., IP Division

(57) ABSTRACT

A stepping motor control device includes a position detection sensor configured to detect a rotation position of a stepping motor, a voltage controller configured to drive the stepping motor, an advance angle controller configured to control an advance angle that is a phase difference between an excitation current applied to a coil of the stepping motor and the rotation position of the stepping motor, and a speed controller configured to control a drive speed of the stepping motor. The speed controller controls the drive speed using, in combination, voltage control by the voltage controller and advance angle control by the advance angle controller.

18 Claims, 16 Drawing Sheets

(56) References Cited

FOREIGN PATENT DOCUMENTS

| | | |
|---|---|---|
| JP | 62-285695 A | 12/1987 |
| JP | 10-150798 A | 6/1998 |
| WO | 2006/005927 A2 | 1/2006 |

\* cited by examiner

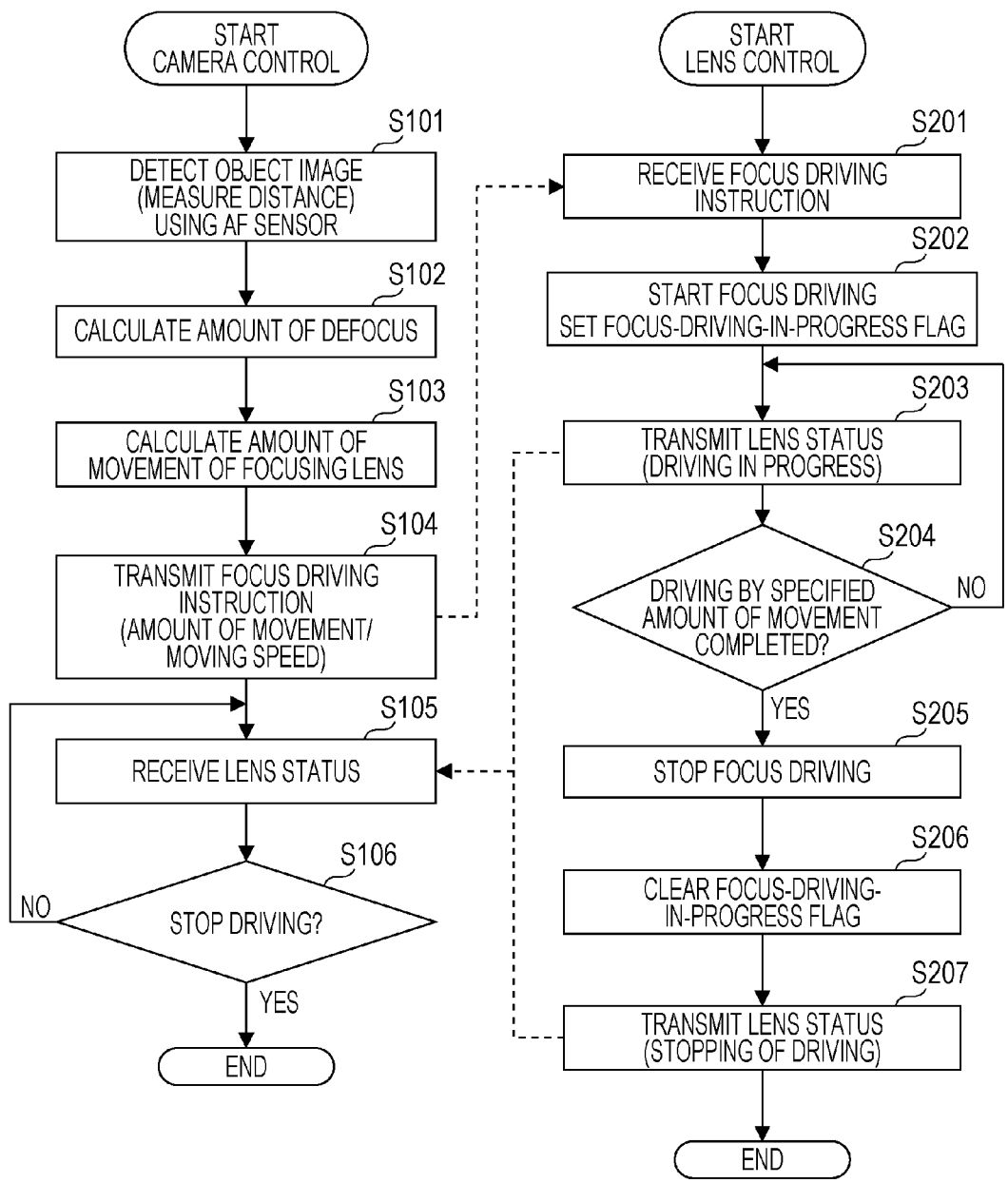

STEPPING MOTOR CONTROL DEVICE, OPTICAL APPARATUS, STEPPING MOTOR CONTROL METHOD, AND NON-TRANSITORY COMPUTER READABLE RECORDING MEDIUM

BACKGROUND OF THE INVENTION

1. Field of the Invention

The present invention relates to a stepping motor control device, an optical apparatus, a stepping motor control method, and a non-transitory computer readable recording medium, and more specifically to a stepping motor control device including a position sensor configured to detect the position of a rotor.

2. Description of the Related Art

A stepping motor is rotatable in steps of a predetermined angle due to the switching of energization of a coil, and thus has a feature of being easily position-controllable without using a position sensor. Because of this feature, a drive mode using open-loop control, in which the state of energization of a coil is switched in accordance with a determined time interval, is generally used. However, there may be a problem in that when the motor is driven at a high speed or when a large load is imposed on the motor, the rotor may not be responsive to the switching of energization of a coil and an out-of-step condition will be prone to occur.

To address this problem, a stepping motor which is switchable to a drive mode which provides high-speed driving through feedback control in which the state of energization of a coil is switched for acceleration or deceleration in accordance with the output of a position sensor configured to detect the position of the rotor is available. In addition, a stepping motor which uses open-loop control and feedback control in combination so that the stepping motor is driven using the open-loop control at low speeds and is driven using the feedback control at high speeds is also available. Thus, it is possible to accurately control the driving of a stepping motor in a low-speed region and a high-speed region.

The relationship between the torque produced by a motor and the rotation speed of the motor is referred to as "T-N characteristics". The T-N characteristics vary depending on the voltage applied to the motor, that is, the voltage across the terminals of a coil. As the voltage increases, the torque produced increases, allowing the motor to rotate at a high speed.

Japanese Patent Laid-Open No. 62-285695 discloses a stepping motor drive control device including an encoder for detecting a rotation angle. A memory in the drive control device stores in advance correspondence data between voltages applied to the motor and rotation speeds of the motor. Accordingly, it is possible to easily determine the value of a voltage to be applied to the motor to make the motor reach the target rotation speed. The control device can reduce the variations of the load on the motor, and can provide accurate control of acceleration and deceleration of the motor.

Japanese Patent Laid-Open No. 10-150798 discloses a drive control method for providing high-speed, high-accuracy rotation of a motor by applying a current having a square driving waveform to the motor in feedback control.

In a case where a stepping motor is mounted in an optical apparatus such as an image capturing apparatus, it is desirable to rapidly move a member included in the optical apparatus and to reduce variations in the speed of the member in order to improve the operability and functionality of the optical apparatus.

SUMMARY OF THE INVENTION

An aspect of the present invention provides a stepping motor control device that may drive a stepping motor at a high speed while reducing variations in speed.

A stepping motor control device according to an aspect of the present invention includes a position detection sensor configured to detect a rotation position of a stepping motor, a voltage controller configured to apply a voltage to the stepping motor to drive the stepping motor, an advance angle controller configured to control an advance angle that is a phase difference between an excitation current applied to a coil of the stepping motor and the rotation position of the stepping motor, and a speed controller configured to control a drive speed of the stepping motor. The speed controller is configured to control the drive speed using first acceleration control in which the advance angle is increased by the advance angle controller while voltage is held constant by the voltage controller, and using second acceleration control in which voltage is increased by the voltage controller and the advance angle is reduced or is held constant by the advance angle controller.

A stepping motor control device according to another aspect of the present invention includes a position detection sensor configured to detect a rotation position of a stepping motor, a voltage controller configured to apply a voltage to the stepping motor to drive the stepping motor, an advance angle controller configured to control an advance angle that is a phase difference between an excitation current applied to a coil of the stepping motor and the rotation position of the stepping motor, and a speed controller configured to control a drive speed of the stepping motor. The speed controller is configured to control the drive speed using first deceleration control in which the advance angle is reduced by the advance angle controller while voltage is held constant by the voltage controller, and using second deceleration control in which voltage is reduced by the voltage controller and the advance angle is increased or is held constant by the advance angle controller.

Further features of the present invention will become apparent from the following description of exemplary embodiments with reference to the attached drawings.

BRIEF DESCRIPTION OF THE DRAWINGS

FIG. 2 is a flowchart illustrating an autofocus operation.

DESCRIPTION OF THE EMBODIMENTS

Figure 1:
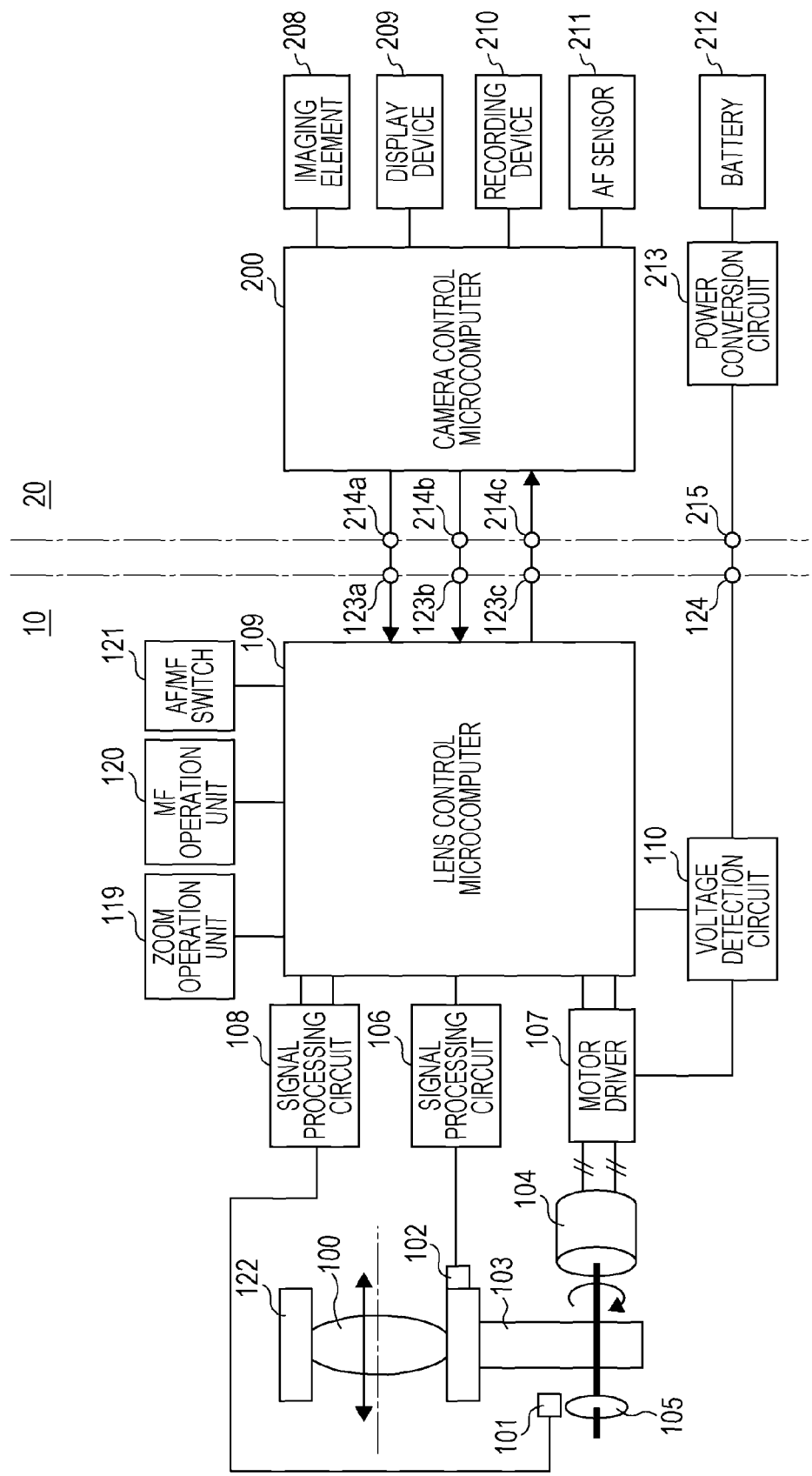
FIG. 1 is a block diagram illustrating a configuration of an image capturing apparatus according to a first embodiment.

Some exemplary embodiments of the present invention will be described in detail hereinafter with reference to the accompanying drawings. FIG. 1 is a block diagram of a lens apparatus 10 including a stepping motor 104 (hereinafter referred to as the "motor 104") provided with an encoder, and a camera apparatus 20 on which the lens apparatus 10 is detachably mounted.

A focusing lens unit 100 performs focus adjustment by moving in directions indicated by an arrow illustrated in FIG. 1 (in the directions of the optical axis of an image capture optical system). A light flux transmitted through the image capture optical system is photoelectrically converted by an imaging element (not illustrated), and is output as an electrical signal. The focusing lens unit 100 is held by a lens holder 122 which may be composed of a cam ring, a guide bar, or the like. The lens holder 122 is configured to be movable in the directions of the optical axis.

A lens control microcomputer 109 is configured to communicate with the camera apparatus 20, to control the driving of the motor 104, and to process signals input from a sensor (i.e., an encoder) described below. A drive transmission unit 103 may be a gear, a lead screw, or the like. The rotating shaft of the motor 104 rotates, thereby allowing the lens holder 122 and the focusing lens unit 100 to be integrally driven through the drive transmission unit 103.

A control signal for driving the motor 104 is generated by the lens control microcomputer 109. The lens control microcomputer 109 generates excitation patterns for individual phases of the motor 104 in accordance with the drive scheme of the motor 104. Examples of the drive scheme include two-phase drive and 1-2 phase drive, which are based on a square-wave driving signal, and micro-step drive, which is based on a sine-wave driving signal.

The lens control microcomputer 109 includes a speed indicator configured to specify the target rotation speed of the motor 104. The lens control microcomputer 109 further includes an advance angle controller configured to control an advance angle that is a phase difference between the excitation current applied to a coil of the motor 104 and the rotation position of the motor 104, and a voltage controller configured to control the voltage to be applied to the motor 104. The lens control microcomputer 109 also includes a speed controller configured to control the rotation speed (or drive speed) of the motor 104 by using, in combination, advance angle control performed by the advance angle controller and driving voltage control performed by the voltage controller.

The generated control signal is converted by a motor driver 107 into current or voltage that is necessary to drive the motor 104, and is supplied to the motor 104. The power required by the motor driver 107 is supplied from a battery 212 included in the camera apparatus 20. The power is supplied via a power conversion circuit 213 configured to convert power into desired voltage. Since the voltage of the battery 212 varies in accordance with the remaining capacity of the battery 212, a step-up or step-down DC-DC converter (power conversion circuit) is used to keep the voltage constant. Furthermore, a power supply contact 215 and a power supply contact 124 are disposed in the camera apparatus 20 and the lens apparatus 10, respectively, to supply power from the camera apparatus 20 to the lens apparatus 10. A voltage detection circuit 110 is configured to detect a voltage value to be supplied to the motor driver 107. The detected voltage is subjected to analog-to-digital (AD) conversion so that information concerning the detected voltage is converted into a digital signal which is input to the lens control microcomputer 109.

A description will now be given of an encoder (position detection sensor). The rotating shaft of the motor 104 is attached to a pulse plate 105. One of the components constituting the encoder is a photo-interrupter 101. A light-shielding portion of the pulse plate 105 passes through the photo-interrupter 101, causing the output of the photo-interrupter 101 to change to a high level or a low level. Accordingly, the rotation angle can be detected. It is also possible to measure a rotation speed by detecting the output period of the photo-interrupter 101. A plurality of photo-interrupters may be used to improve the detection accuracy of the rotation angle and to further detect the rotation direction. In this embodiment, a photo-interrupter is used as the encoder. Alternatively, a Hall effect element or a magnet may be used as the encoder. A signal processing circuit 108 amplifies and level-converts the output of the photo-interrupter 101. Thus, the output of the photo-interrupter 101 is converted to a signal level that is detectable by the lens control microcomputer 109.

A photo-interrupter 102 is configured to detect a reference position of the focusing lens unit 100. The output of the photo-interrupter 102 is input to a signal processing circuit 106, and is converted to a signal level (for example, a high/low level) that is detectable by the lens control microcomputer 109. The position of the focusing lens unit 100 at the time when the output of the photo-interrupter 102 changes from the high level to the low level or changes from the low level to the high level is used as a reference position. Accordingly, the absolute position of the focusing lens unit 100 can be detected.

Contact portions 123a, 123b, and 123c on the lens apparatus 10 side for communication lines are contact portions for a clock signal line, a data line from the camera apparatus 20 to the lens apparatus 10, and a data line from the lens apparatus 10 to the camera apparatus 20, respectively. In this embodiment, three-wire serial communication is used. An alternative communication method such as an asynchronous communication method or low voltage differential signaling (LVDS) may be used. The lens control microcomputer 109 receives a driving instruction, camera identification information, a status, image capture conditions, and so on from the camera apparatus 20 via the communication line 123b. Further, the lens control microcomputer 109 transmits lens identification information, a status, and information on positions such as focus, aperture, and zoom positions to the camera apparatus 20 via the communication line 123c.

The lens apparatus 10 includes a zoom operation unit 119, a manual focus (MF) operation unit 120, and an automatic focus (AF)/manual focus (MF) switch 121. A zoom operation is performed using the zoom operation unit 119. In an inner-focus zoom lens system in which a front lens does not move during focusing, a focusing lens unit needs to move to correct for changes in focal point caused by the zoom operation. The control necessary for the movement of a focusing lens unit is called tracking control, and the relationship between a focusing lens unit and a zoom lens unit is determined in accordance with a tracking curve. The MF operation unit 120 is composed of a focus button, a focus ring, or the like. A user may operate the MF operation unit 120 to adjust the position of the focusing lens unit 100.

A description will now be given of the camera apparatus 20. A camera control microcomputer 200 is configured to control operations such as capturing of an image and recording of the image on a recording device. The camera control microcomputer 200 transmits a driving instruction and information such as image capture conditions to the lens apparatus 10 via a contact portion, and receives information such as the state of the lens apparatus 10 from the lens apparatus 10 via a contact portion. Contact portions 214a, 214b, and 214c are contact portions on the camera apparatus 20 side for a clock signal line, a data line from the camera apparatus 20 to the lens apparatus 10, and a data line from the lens apparatus 10 to the camera apparatus 20, respectively.

The camera apparatus 20 includes a display device 209 such as a liquid crystal display or an organic electroluminescent (EL) display, a recording device 210, and an AF sensor 211. The display device 209 is configured to display image capture conditions and a captured image. The recording device 210 stores a captured still image or moving image. The AF sensor 211 is configured to automatically adjust the focus (or perform autofocusing) by measuring the distance to the object in a phase difference autofocus method. AF may be implemented not only by a phase difference method using the AF sensor 211 but also by a contrast method based on image contrast information obtained by an imaging element 208.

Communication lines and power supply lines for the camera apparatus 20 and the lens apparatus 10 are connected via a mount (not illustrated). The camera apparatus 20 and the lens apparatus 10 may communicate with each other at each communication timing or in a fixed period. Examples of the fixed period include the period of a vertical synchronization signal that defines the period of a signal output from the imaging element 208.

Figure 16:
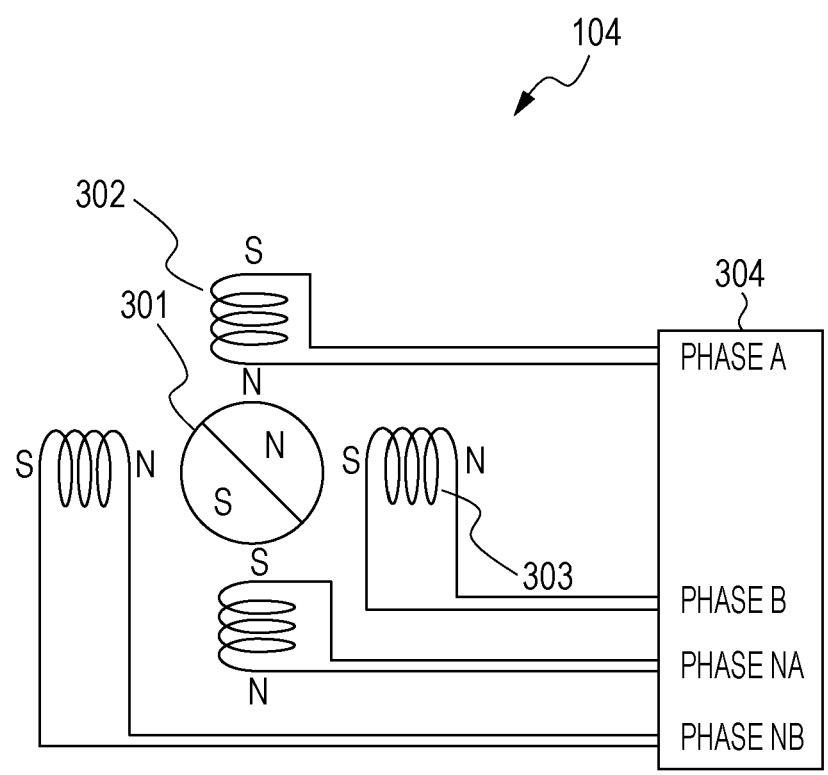
FIG. 16 is a diagram illustrating a configuration of the stepping motor.

A configuration of the stepping motor 104 will now be briefly described with reference to FIG. 16. The stepping motor 104 includes a rotor 301 formed of a magnet, and coils 302 and 303. The coils 302 are excitation coils assigned to phase A, and the coils 303 are excitation coils assigned to phase B. The excitation coils 302 and 303 function as stators, and each of the excitation coils 302 and 303 has a core arranged therein. A current flowing through each of the excitation coils 302 and 303, or a voltage to be applied across the terminals of each of the coils 302 and 303, is changed, thereby changing a magnetic field produced, which causes the rotor 301 to rotate. A motor driver 304 corresponds to the motor driver 107 illustrated in FIG. 1.

FIG. 2 is a diagram illustrating a focus drive operation of an image capturing apparatus including, in combination, the camera apparatus 20 and the lens apparatus 10 illustrated in FIG. 1. In FIG. 2, a flowchart of an operation for phase-difference autofocus using an AF sensor is illustrated. In FIG. 2, "S" stands for "step", and the flowchart illustrated in FIG. 2 may be implemented as a control program for allowing a computer to achieve the function of each step.

First, a description will be given of the control of the camera apparatus 20. The steps for the camera apparatus 20 are executed by the camera control microcomputer 200 unless otherwise specified.

In S101, the AF sensor 211 detects an image of an object, and measures the distance to the object using correlation calculation. In S102, information on the detected distance is converted into an amount of defocus on an imaging surface. In S103, the amount of movement of the focusing lens unit 100 is calculated in accordance with the amount of defocus determined in S102 using information indicating the relationship between the amount of movement on the imaging surface and the amount of movement of the focusing lens unit 100.

In S104, a focus driving instruction is transmitted to the lens apparatus 10 to drive the focusing lens unit 100 by the amount of movement calculated in S103. In this case, an instruction concerning the moving speed of the focusing lens unit 100 is also transmitted. The moving speed depends on the amount of movement of the focusing lens unit 100 and image capture conditions such as the aperture speed and the shutter speed. After the focus driving instruction has been transmitted, then in S105, the status of the lens apparatus 10 is checked through communication with the lens apparatus 10. That is, status information indicating whether or not the focusing lens unit 100 is being driven is received from the lens apparatus 10. After the status information has been received, then in S106, it is determined whether the focusing lens unit 100 is being driven or is not in operation. If the focusing lens unit 100 is being driven, the reception of the lens status in S105 and the checking as to whether or not the focusing lens unit 100 is being driven in S106 are repeated. When the driving of the focusing lens unit 100 stops, it is determined that the object is in focus, and the process ends.

Next, a description will be given of the control of the lens apparatus 10. The steps for the lens apparatus 10 are executed by the lens control microcomputer 109 unless otherwise specified.

First, in S201, the focus driving instruction is received from the camera apparatus 20. In this case, the amount of movement and moving speed of the focusing lens unit 100, which are specified by the camera apparatus 20, are also received. In S202, the driving of the focusing lens unit 100 is started. Specifically, the application of a driving voltage to the motor 104 is started, and a flag indicating that the focusing lens unit 100 is being driven is set. In S202, the amount of movement and moving speed of the focusing lens unit 100 is converted into the amount of rotation (rotation angle) and rotation speed of the motor 104.

In S203, the status of the lens apparatus 10 is transmitted to the camera apparatus 20. In this case, information indicating whether or not the focusing lens unit 100 is being driven is transmitted. In S204, it is determined whether or not the focusing lens unit 100 has moved by the amount of movement received in S201. If the movement has not been completed, in S203, the status of the lens apparatus 10 is transmitted again to the camera apparatus 20, and the determination of S204 is repeated. If it is determined in S204 that the movement has been completed, in S205, the driving of the focusing lens unit 100, that is, the rotation of the motor 104, is stopped. Then, in S206, the flag indicating that the focusing lens unit 100 is being driven is cleared. Then, in S207, the status of the lens apparatus 10 is transmitted to the camera apparatus 20 to stop the driving of the focusing lens unit 100.

Figure 3A:
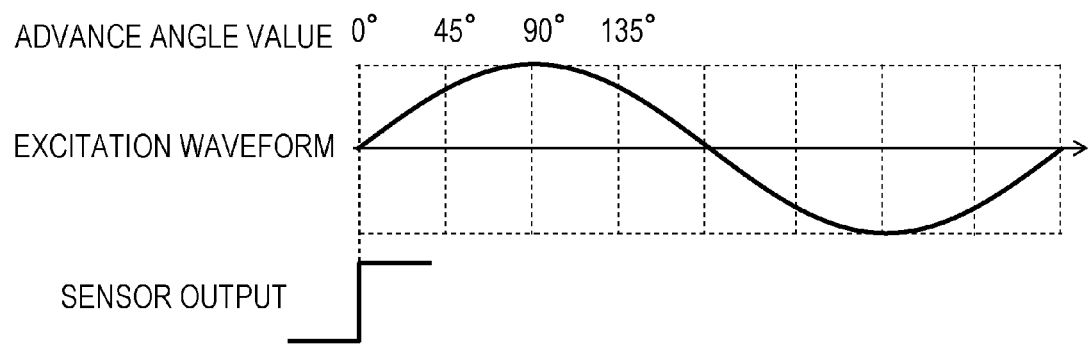
FIGS. 3A and 3B are schematic diagrams illustrating advance angle control.
Figure 3B:
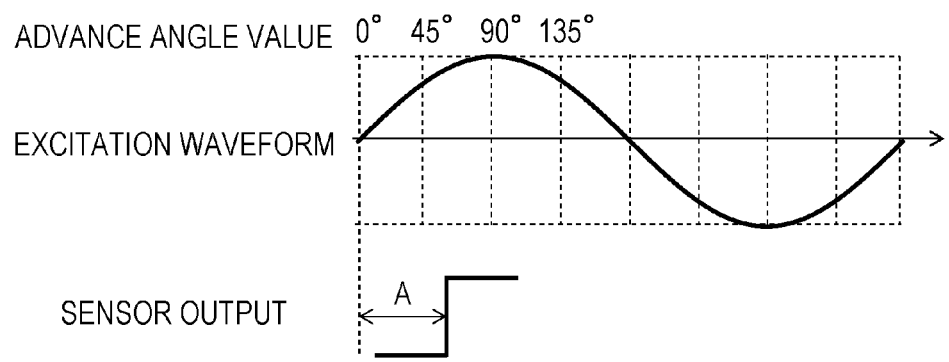

Next, a drive control method for the stepping motor 104 provided with the encoder will be described with reference to FIGS. 3A and 3B. FIGS. 3A and 3B illustrate waveforms of an excitation current applied to a coil of the motor 104. In an embodiment of the present invention, advance angle control is performed on the output of the encoder configured to detect the rotation position of the motor 104 to provide feedback drive. That is, a current applied to a coil of the motor 104 is controlled using an excitation waveform that causes the output of the encoder configured to detect the rotation position of the motor 104 to advance in phase. Here, a phase difference between the excitation current applied to a coil of the motor 104 and the rotation position of the motor 104 is referred to herein as an advance angle.

In open-loop control, the motor 104 is driven at a speed with a sufficient torque margin. In feedback control, on the other hand, the motor 104 is controlled by the application of an appropriate excitation voltage in accordance with the rotation angle or rotation speed of the motor 104 detected by the encoder.

In general, there is a relationship between the advance angle and the rotation speed of the motor 104 in which as the advance angle increases, the rotation speed increases. Thus, the advance angle can be adjusted for feedback control of the rotation speed of the motor 104.

As illustrated in FIG. 3A, the advance angle is defined as 0° in the case where, given that the occurrence of the high/low switching edge of the output of the encoder is used as a reference, the reference has the same phase as the point at which a predetermined excitation phase crosses zero. In order to increase the rotation speed of the motor 104, as illustrated in FIG. 3B, the advance angle is increased. Repeating the operation of increasing the advance angle for each edge of the sensor output can increase the speed to the target rotation speed in a gradual, stepwise fashion.

In order to reduce the rotation speed of the motor 104, on the other hand, repeating the operation of reducing the advance angle for each edge of the sensor output can decrease the speed to the target rotation speed in a gradual, stepwise fashion. Furthermore, in order to keep the rotation speed of the motor 104 constant, the advance angle is repeatedly controlled to converge the rotation speed. In FIG. 3A, a rising edge of the sensor output coincides with the zero crossing point of the excitation waveform. In actuality, however, a shift A between the phase of the output of the encoder and the excitation phase of the motor 104 needs to be corrected.

Figure 4:
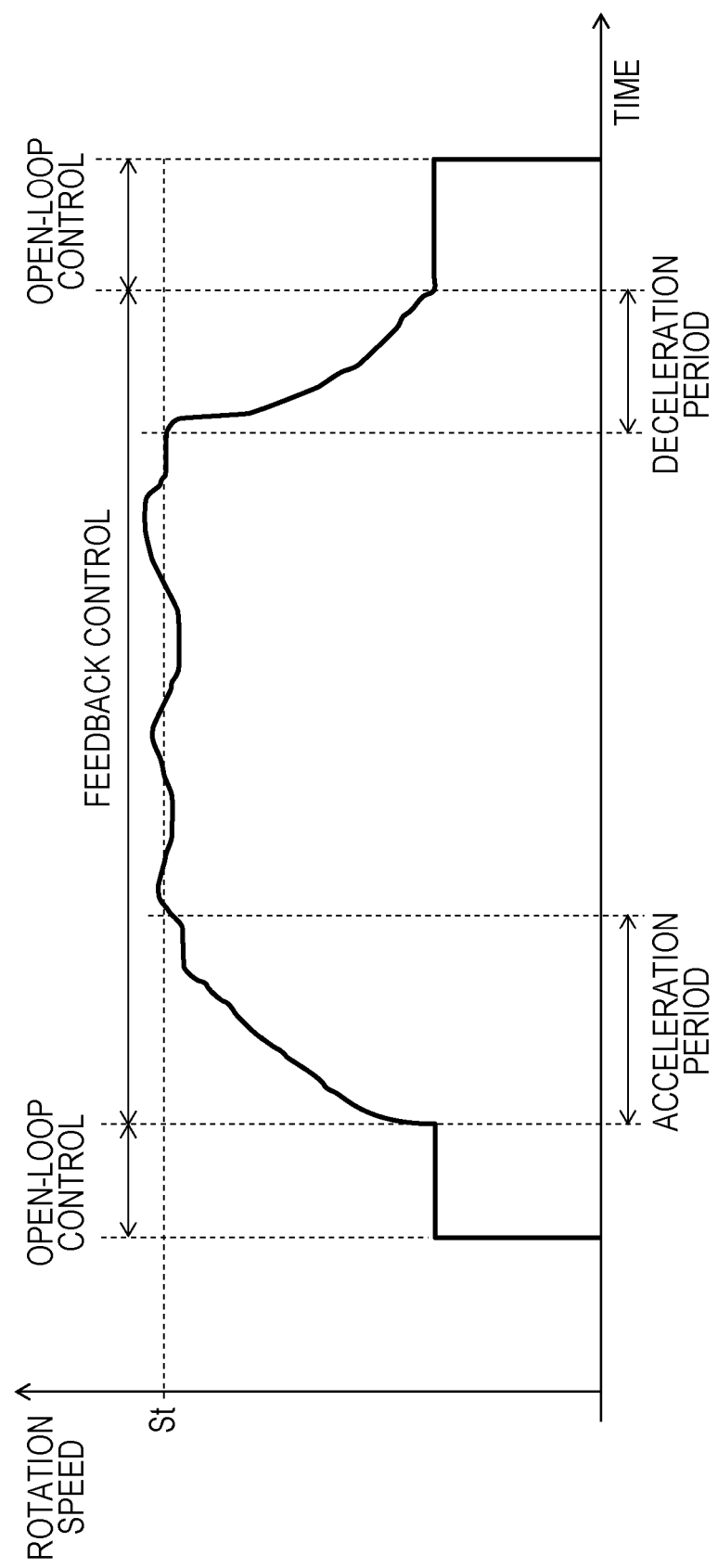
FIG. 4 is a diagram illustrating changes in the rotation speed of a stepping motor over time when the advance angle control is used.

Next, an example in which the motor 104 is driven by advance angle control is illustrated in FIG. 4. The motor 104 is driven by open-loop control during the period from the beginning of the driving until the rotation of the motor 104 is stabilized. The motor 104 is also driven by open-loop control when the motor 104 is stopped, to accurately stop the rotation of the motor 104. Here, the motor 104 is driven by open-loop control to stabilize the rotation of the motor 104. For other purposes such as to prioritize the time taken to reach the target speed, the motor 104 may be driven only by advance angle control. During the acceleration period of the motor 104, the motor 104 is driven by advance angle control to reach a target speed St. During the deceleration period, the motor 104 is driven by advance angle control from the target speed St up to a speed at which the current control is switched to the open-loop control, to reduce the rotation speed.

Figure 5:
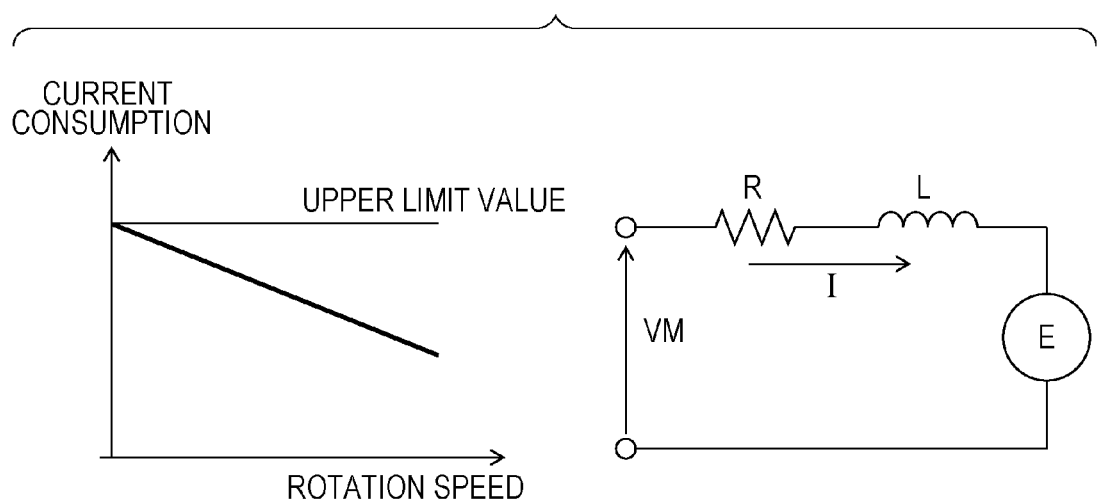
FIG. 5 is a diagram illustrating the relationship between the rotation speed of the stepping motor and current consumption.

FIG. 5 illustrates a relationship between a consumed current I flowing through a coil of the motor 104 and the rotation speed of the motor 104. An applied voltage applied between the terminals of a coil is represented by VM, and the resistive component and the inductive component of the coil are represented by R and L, respectively. When the motor 104 is rotated with the applied voltage VM kept constant, a counter-electromotive force E is produced. Since the counter-electromotive force E increases in proportion to the rotation speed of the motor 104, as illustrated in the left part of FIG. 5, the current consumption of the motor 104 decreases as the rotation speed of the motor 104 increases. That is, the torque of the motor 104 decreases in accordance with an increase in the rotation speed of the motor 104.

In the left part of FIG. 5, the upper limit value refers to the maximum value of power that can be applied to the motor 104. The upper limit value of power is determined based on limitations on the rated current of a battery and limitations for avoiding an excessive load being imposed on the motor 104.

Figure 6:
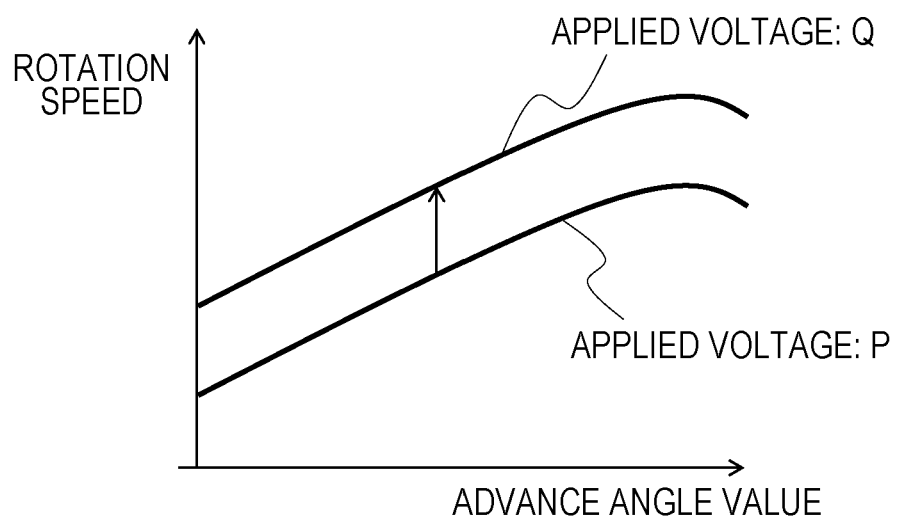
FIG. 6 is a diagram illustrating the relationship between advance angle and rotation speed.

FIG. 6 illustrates a relationship between the rotation speed of the motor 104 and the advance angle (hereinafter referred to as the advance angle characteristics). The rotation speed of the motor 104 increases when the advance angle increases, and the advance angle characteristics vary when the applied voltage VM changes. In FIG. 6, an applied voltage P and an applied voltage Q have the relationship of Q>P. The higher the applied voltage is, the higher the torque of the motor 104 is, and thus the higher the rotation speed of the motor 104 becomes. The advance angle characteristics exhibit a local maximum for the rotation speed of the motor 104, and have a speed region where the rotation speed of the motor 104 does not increase even though the advance angle is increased.

Taking the counter-electromotive force E into account, it is conceivable to increase the current flowing through a coil by increasing the applied voltage VM in a range that does not exceed the upper limit value of power consumption so that the torque of the motor 104 is prevented from decreasing. However, as indicated by the arrow in FIG. 6, since increasing the applied voltage changes the rotation speed of the motor 104, frequent changes in the applied voltage may cause unnatural fluctuations in speed.

Figure 7:
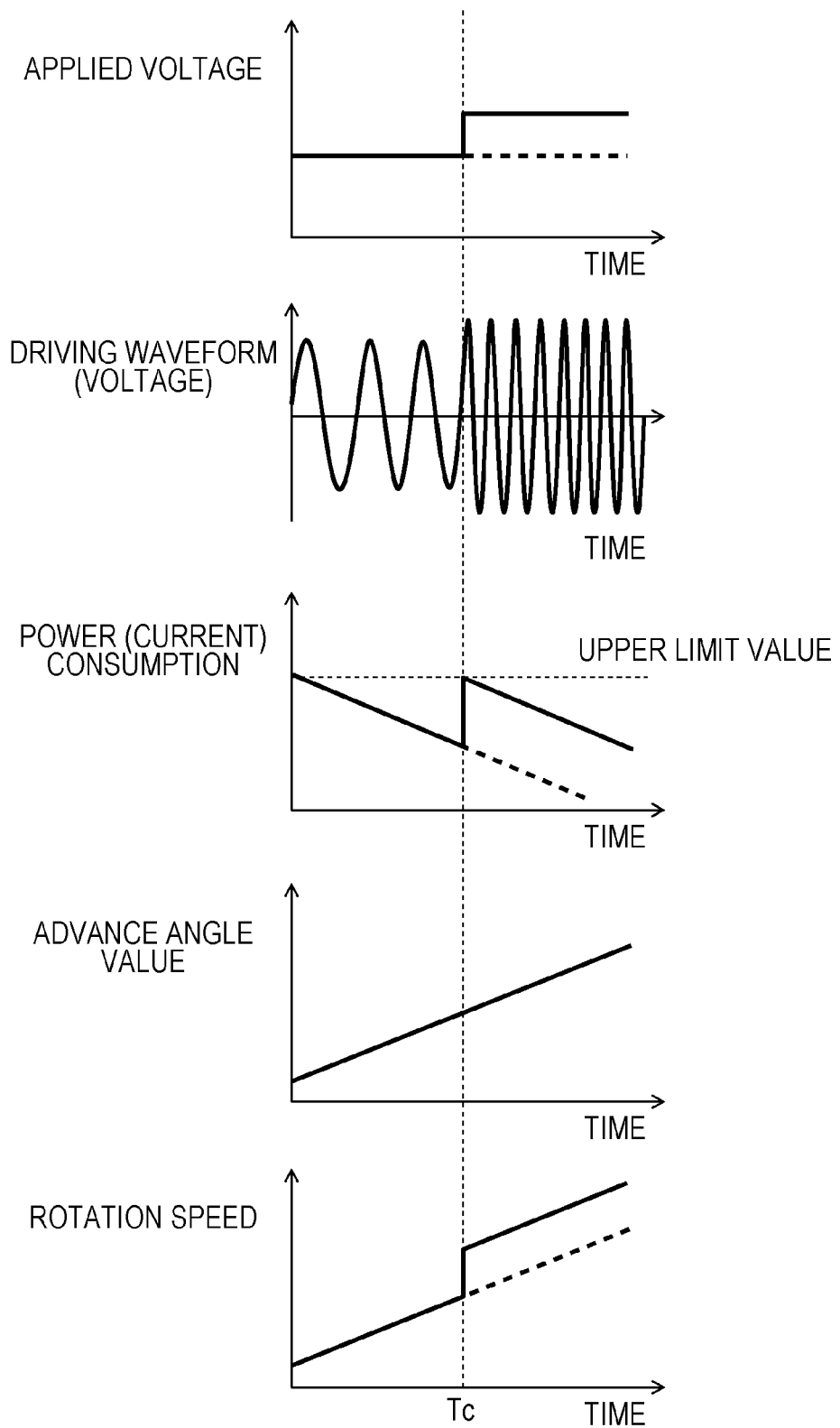
FIG. 7 is a diagram illustrating changes in individual parameters for a control device according to the first embodiment over time during the acceleration of the motor.

Examples of unnatural fluctuations in speed will be described with reference to FIG. 7. FIG. 7 illustrates changes in applied voltage to be applied to the motor 104, driving waveform (voltage), power consumption (current), advance angle, and rotation speed over time during the acceleration of the motor 104. The applied voltage is a value equivalent to the actual value of the driving waveform, and time Tc represents the timing of changing the applied voltage to be applied to the motor 104.

The simplest method for changing the applied voltage to be applied to the motor 104 is to increase the voltage to be input to the motor driver 107. In another method, the voltage on time to off time ratio (duty ratio) may be changed while the voltage to be input to the motor driver 107 is kept constant, thereby changing the applied voltage.

It is assumed here that the applied voltage is increased at the time Tc. At this time, as illustrated in FIG. 7, the amplitude of the driving waveform increases. Note that the driving waveform is assumed to be a driving waveform for micro-step control. When the focus is on power consumption, due to the influence of the counter-electromotive force, the power consumption decreases in accordance with an increase in the rotation speed of the motor 104, and the power consumption suddenly increases at the time Tc. In this regard, the power consumption needs to be controlled so as not to exceed the upper limit value. In this case, if the advance angle is intermittently increased, as illustrated in the bottom part of FIG. 7, the rotation speed of the motor 104 will suddenly change.

First Embodiment

A control method according to a first embodiment for reducing variations in the rotation speed of the motor 104 by changing the advance angle in accordance with a change in the applied voltage will be described with reference to FIG. 8, FIG. 9, and FIG. 10.

Figure 8:
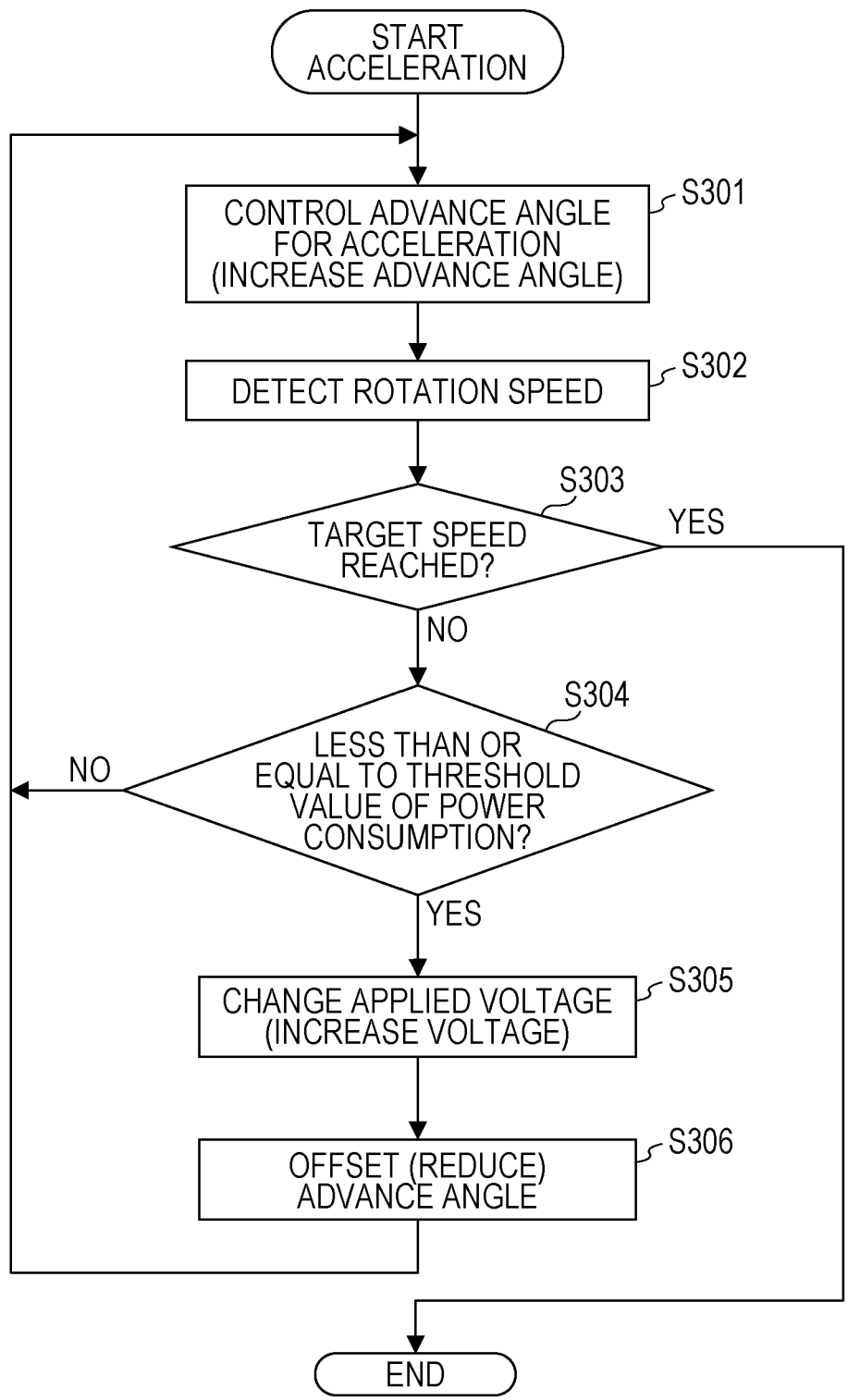
FIG. 8 is a flowchart illustrating a speed control method for the control device according to the first embodiment during the acceleration of the motor.

FIG. 8 is a flowchart illustrating a control method for the motor 104 in the case of acceleration control of the motor 104. In FIG. 8, "S" stands for "step", and the flowchart illustrated in FIG. 8 may be implemented as a control program for allowing a computer to achieve the function of each step. The steps are executed by the lens control microcomputer 109 unless otherwise specified. The control flow illustrated in FIG. 8 is executed by causing the lens control microcomputer 109 to read a control program stored in the lens control microcomputer 109.

During the acceleration period in the advance angle control, in S301, the advance angle is increased to accelerate the rotation of the motor 104. Then, in S302, the rotation speed of the motor 104 is detected based on the output of the encoder. Then, in S303, the detected rotation speed of the motor 104 is compared with the target speed, and it is determined whether or not the target speed is reached. If the target speed is reached, the acceleration control of the motor 104 ends. If the target speed is not reached, in S304, it is determined whether or not power consumption is less than or equal to a threshold value. The determination of whether or not the threshold value is reached is based on whether or not the upper limit value of the power consumption is not exceeded even if the applied voltage is changed in S305. If the changing of the applied voltage is possible, the process proceeds to S305, and otherwise, it returns to S301.

Information concerning power consumption, which is used for the determination of S304, may be obtained by actually measuring a voltage value or a current value. However, for an implementation of simple circuitry, the fact that the rotation speed of the motor 104 is substantially proportional to power consumption may be utilized and power consumption may be estimated from the detected rotation speed of the motor 104. Instead of power consumption, the detected rotation speed of the motor 104 may be used to determine whether or not the changing of the applied voltage is possible. In a case where power consumption is detected based on the rotation speed of the motor 104, the lens control microcomputer 109 is provided with a storage unit, and data indicating a correspondence relationship between the rotation speed of the motor 104 and power consumption is stored in the storage unit.

If it is determined in S304 that the changing of the applied voltage to the motor 104 is possible, in S305, the applied voltage to be applied to the motor 104 is changed. In order to accelerate the rotation of the motor 104, the applied voltage is increased. The applied voltage may be changed by, as described above, increasing the input voltage to the motor driver 107 or changing the duty ratio of the applied voltage to be input to the motor 104. In S306, the advance angle is offset so as to cancel the changes in the rotation speed of the motor 104 caused by the changing of the applied voltage. In the flowchart illustrated in FIG. 8, the processes of S305 and S306 are illustrated as separate blocks, for simplicity of description. In actuality, however, the process of S306 needs to be substantially concurrent with the process of S305.

Figure 9:
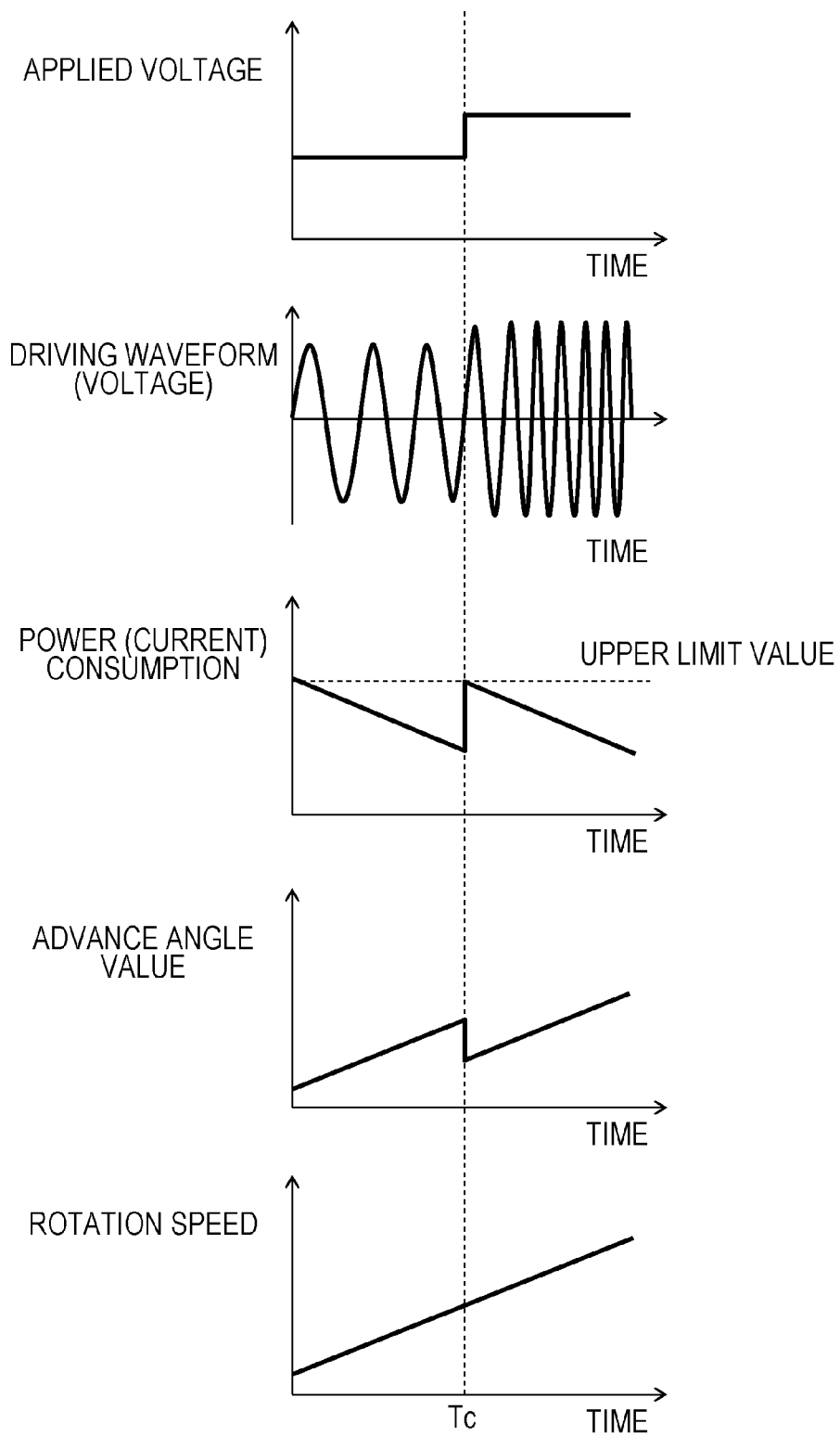
FIG. 9 is a diagram illustrating changes in individual parameters for the control device according to the first embodiment over time during the acceleration of the motor with reduced speed variations.

FIG. 9 illustrates changes in the individual parameters over time in the flowchart illustrated in FIG. 8. It is assumed that the applied voltage is increased at time Tc. At this time, as illustrated in FIG. 9, the amplitude of the driving waveform increases. Due to the influence of the counter-electromotive force, the power consumption decreases as the rotation speed of the motor 104 increases, and, at the time Tc, the power consumption increases in a range that does not exceed the upper limit value. At this time, the advance angle is reduced, thereby providing a smooth change in the rotation speed of the motor 104, which may reduce rapid fluctuations in speed when the motor 104 is accelerated.

Figure 10:
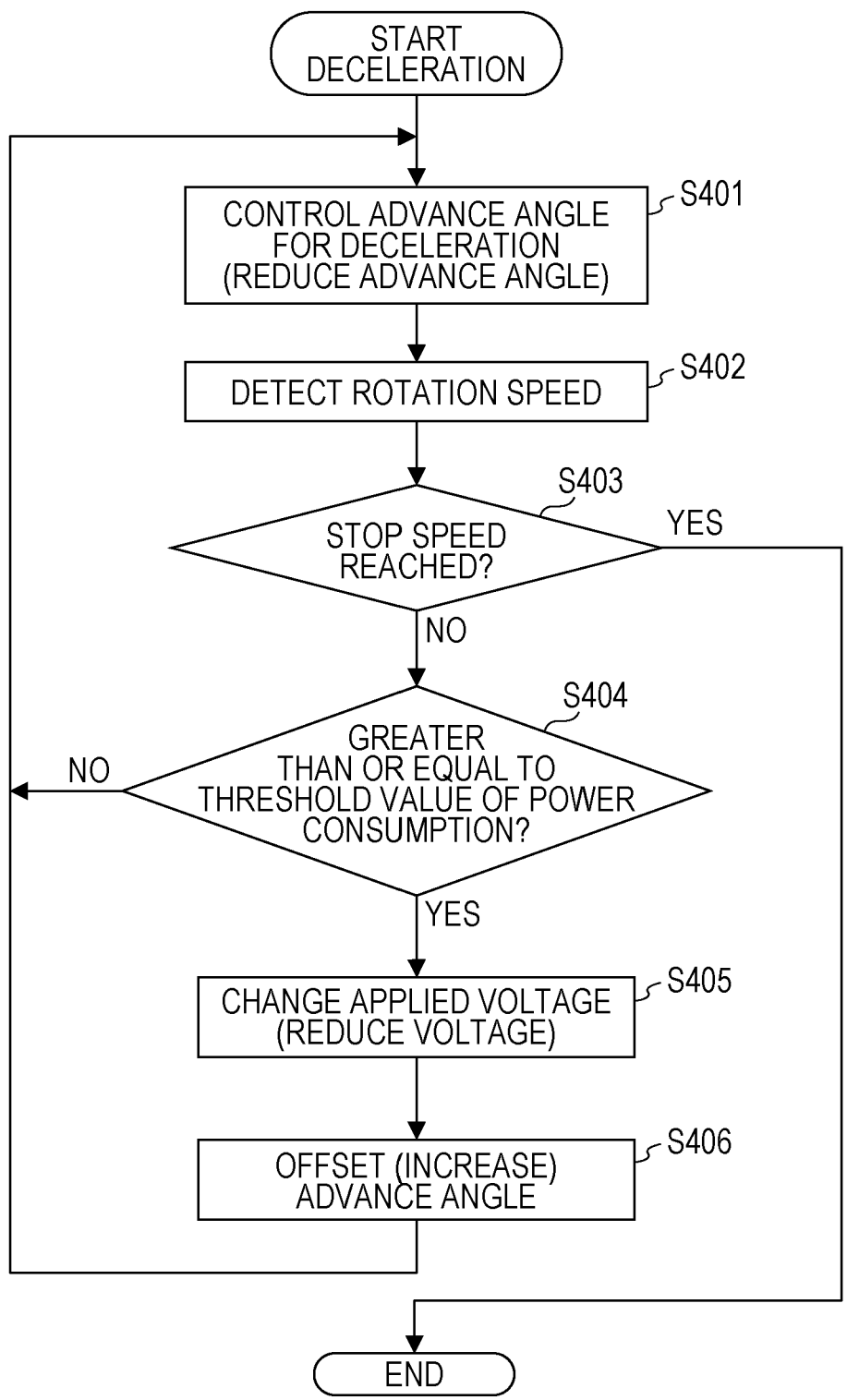
FIG. 10 is a flowchart illustrating a speed control method for the control device according to the first embodiment during the deceleration of the motor.

FIG. 10 is a flowchart illustrating a control method for the motor 104 in the case of deceleration control of the motor 104. In FIG. 10, "S" stands for "step", and the flowchart illustrated in FIG. 10 may be implemented as a control program for allowing a computer to achieve the function of each step. The steps are executed by the lens control microcomputer 109 unless otherwise specified.

During the deceleration period in the advance angle control, in S401, the advance angle is reduced to decelerate the rotation of the motor 104. Then, in S402, the rotation speed of the motor 104 is detected based on the output of the encoder. Then, in S403, it is determined whether or not the detected rotation speed of the motor 104 reaches a speed (stop speed) at which the current control is switched to the open-loop control. The stop speed refers to the rotation speed of the motor 104 when switching from the feedback control to the open-loop control is carried out, and is a predetermined speed.

If the stop speed is reached, the deceleration control of the motor 104 ends. If the stop speed is not reached, in S404, it is determined whether or not power consumption is greater than or equal to a predetermined threshold value. In the deceleration of the rotation of the motor 104, the counter-electromotive force decreases as the rotation speed decreases. For this reason, if the applied voltage is held even while the rotation speed is low, the power consumption may exceed the upper limit value during the deceleration period. To mitigate this risk, through the determination of S404, the applied voltage is reduced before the power consumption exceeds the upper limit value.

If it is determined in S404 that the changing of the applied voltage to the motor 104 is necessary, in S405, the applied voltage to be applied to the motor 104 is changed. In order to decelerate the rotation of the motor 104, the applied voltage is reduced. In S406, the advance angle is offset so as to cancel the changes in the rotation speed of the motor 104 caused by the changing of the applied voltage. Similarly to the relationship between S305 and S306 in FIG. 8, the process of S406 needs to be substantially concurrent with the process of S405.

As described above, when a stepping motor provided with an encoder is driven by advance angle control, the voltage applied to the motor and the advance angle may be appropriately controlled, thereby achieving efficient use of power and achieving high-speed rotation of the motor. In addition, the variations in the speed of the motor during acceleration or deceleration of the motor may be reduced, thereby providing a smooth change in the rotation speed of the motor.

In this embodiment, the camera apparatus 20 includes the battery 212 and the power conversion circuit 213. Alternatively, the lens apparatus 10 may include the power conversion circuit 213.

Second Embodiment

Figure 11:
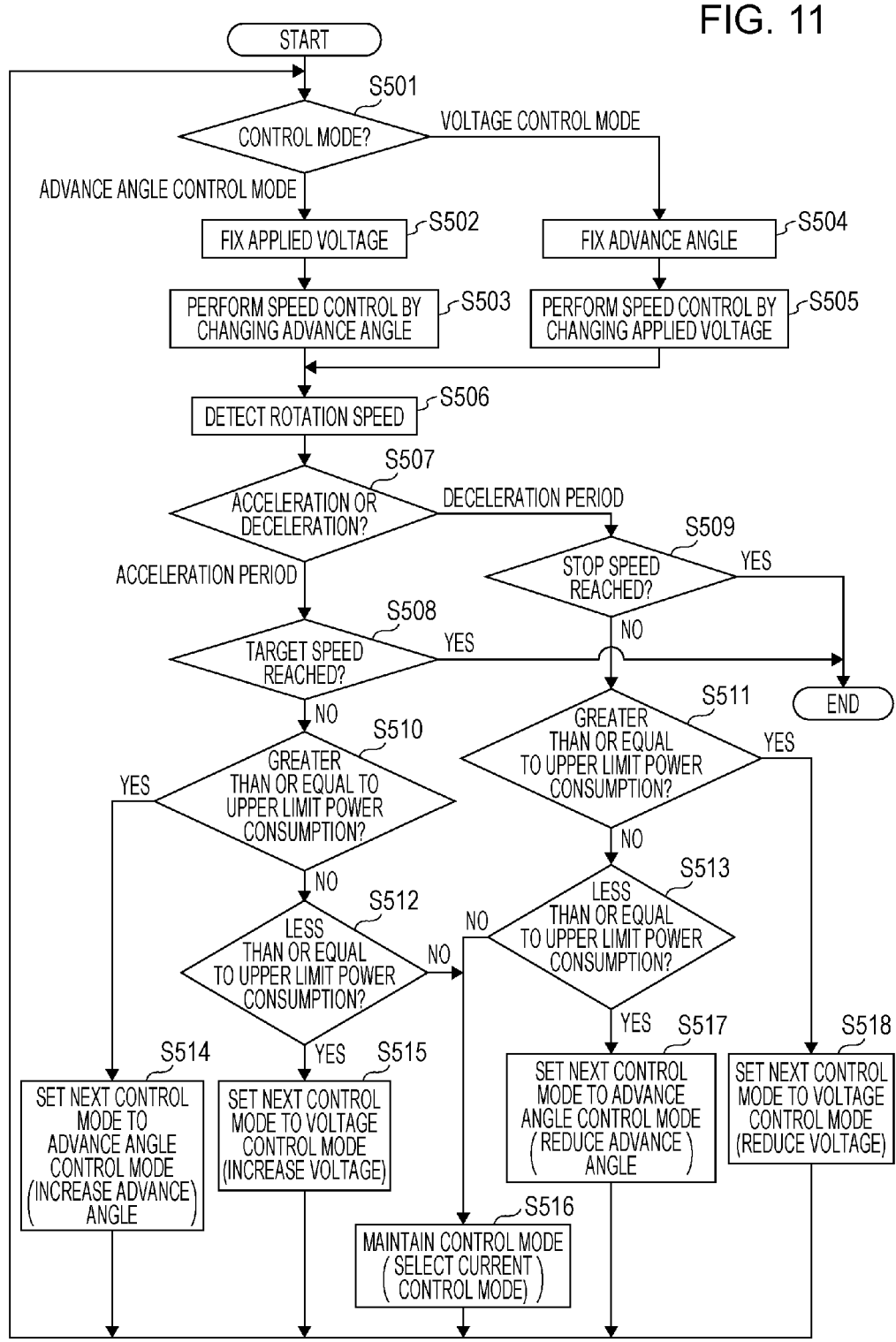
FIG. 11 is a flowchart illustrating speed control for a control device according to a second embodiment, in which an advance angle control mode and a voltage control mode are used in combination.

In the first embodiment, the applied voltage is changed at a specific timing, and the advance angle is changed in accordance with the change in the applied voltage, thereby reducing variations in the rotation speed of the motor 104. This embodiment provides a method in which the variations in the rotation speed of the motor 104 are reduced by switching between control (voltage control mode) in which the applied voltage is changed with the advance angle kept constant and control (advance angle control mode) in which the advance angle is changed with the applied voltage kept constant. FIG. 11 illustrates an operation flow for the acceleration and deceleration of the motor 104 according to this embodiment. In FIG. 11, "S" stands for "step", and the flowchart illustrated in FIG. 11 may be implemented as a control program for allowing a computer to achieve the function of each step. The steps are executed by the lens control microcomputer 109 unless otherwise specified. The control flow illustrated in FIG. 11 is executed by causing the lens control microcomputer 109 to read a control program stored in the lens control microcomputer 109.

First, in S501, it is determined whether the control mode is the voltage control mode or the advance angle control mode. If the control mode is the advance angle control mode, in S502, the applied voltage is fixed. Then, in S503, the advance angle is increased or decreased to control the acceleration or deceleration of the motor 104.

If the control mode is the voltage control mode, in S504, the advance angle is fixed. Then, in S505, the applied voltage is increased or decreased to control the acceleration or deceleration of the motor 104. In the flowchart illustrated in FIG. 11, when the process begins from START, the control mode is set to the advance angle control mode. In S506, the rotation speed of the motor 104 is detected based on the output of the encoder. In S507, it is determined whether the motor 104 is being accelerated or decelerated.

If the motor 104 is being accelerated, the process proceeds to S508. In S508, it is determined whether or not the target speed is reached. This determination is based on the rotation speed detected in S506. If the target speed is reached, the process ends.

If the target speed is not reached, in S510, it is determined whether or not power consumption is greater than or equal to the upper limit value. If power consumption is greater than or equal to the upper limit value, control using the voltage control mode is not available. Thus, in S514, the control mode is set to the advance angle control mode. If power consumption is less than the upper limit value, then in S512, it is determined whether or not power consumption is less than or equal to a lower limit value. If power consumption is not less than or equal to the lower limit value, then in S516, the current control mode is maintained, and then the process starts again from S501. If power consumption is less than or equal to the lower limit value, then in S515, the next control mode is set to the voltage control mode.

If it is determined in S507 that the motor 104 is being decelerated, then in S509, it is determined whether or not the stop speed is reached. This determination is based on the rotation speed detected in S506. If the stop speed is reached, the process ends.

If the stop speed is not reached, in S511, it is determined whether or not power consumption is greater than or equal to the upper limit value. If power consumption is greater than or equal to the upper limit value, deceleration using the advance angle control mode is not available. Thus, in S518, the control mode is set to the voltage control mode. If power consumption is less than the upper limit value, then in S513, it is determined whether or not power consumption is less than or equal to the lower limit value. If power consumption is not less than or equal to the lower limit value, then in S516, the current control mode is maintained, and then the process starts again from S501. If power consumption is less than or equal to the lower limit value, then in S517, the next control mode is set to the advance angle control mode.

The determination of power consumption may be based on actual measurement of voltage or current. However, for an implementation of simple circuitry, the fact that the rotation speed of the motor 104 is substantially proportional to power consumption may be utilized and power consumption may be estimated from the detected rotation speed of the motor 104. Instead of power consumption, the detected rotation speed of the motor 104 may be used to estimate power consumption. The upper limit value and lower limit value of power consumption are values provided for the determination of the switching timing of the control mode. Even if the power consumption exceeds the upper limit value or the lower limit value, the control of the rotation of the motor 104 might not be immediately lost.

Figure 12:
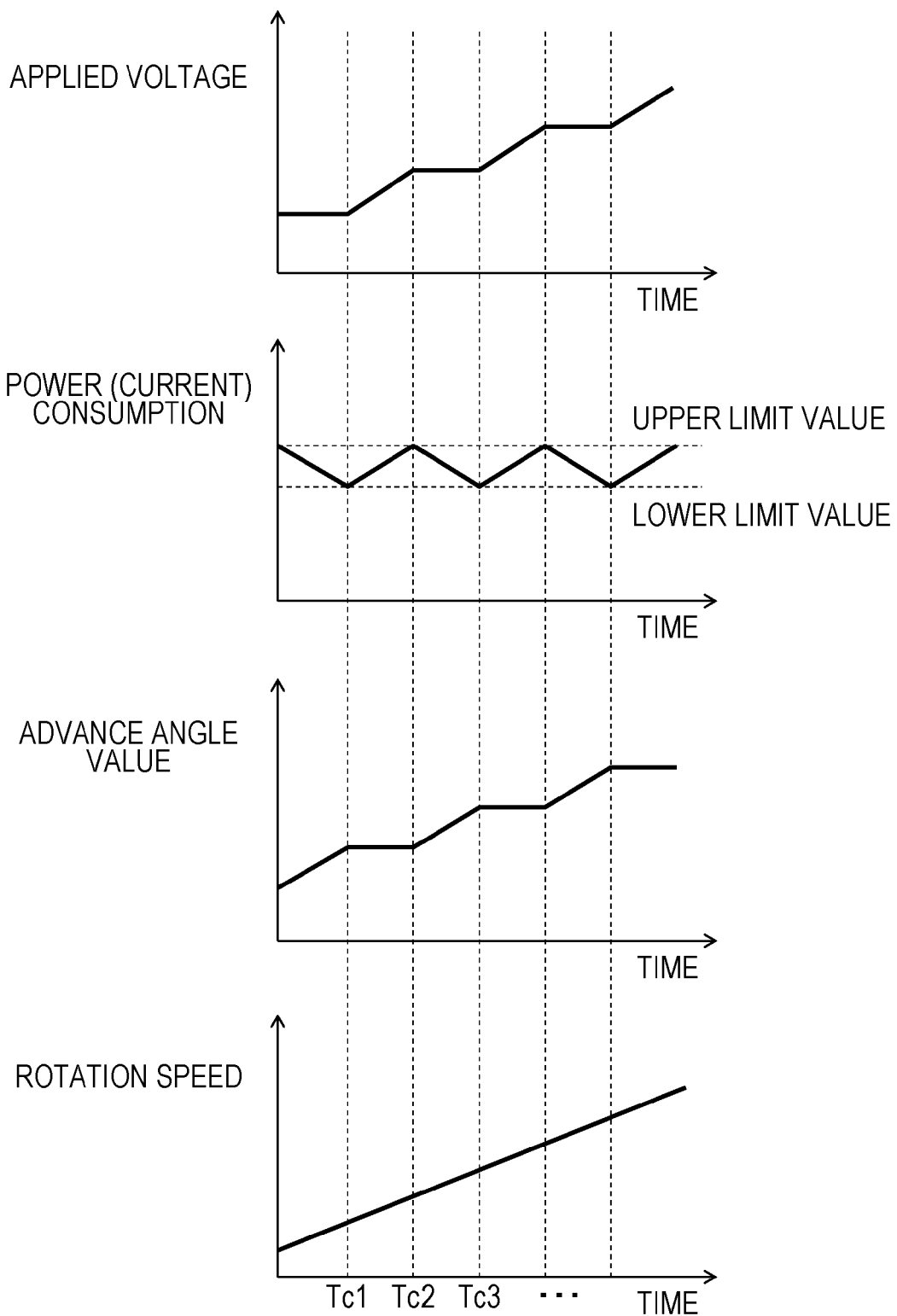
FIG. 12 is a diagram illustrating changes in individual parameters for the control device according to the second embodiment over time during an acceleration period.

FIG. 12 illustrates changes in the individual parameters over time during acceleration according to this embodiment. Times Tc1, Tc2, Tc3, . . . represent the timings of switching of the control mode. In FIG. 12, first, the advance angle is changed in the advance angle control mode to increase the rotation speed of the motor 104. Increasing the rotation speed produces a counter-electromotive force, which can result in an increase in the applied voltage. If power consumption reaches a predetermined lower limit value, the current control mode is switched to the voltage control mode, and the applied voltage is changed to change the rotation speed of the motor 104. As the rotation speed of the motor 104 is increased by increasing the applied voltage, power consumption reaches a predetermined upper limit value. At this time, switching to the advance angle control mode is carried out. Sequential switching of the control mode in the manner described above allows smooth speed control of the motor 104.

Figure 13:
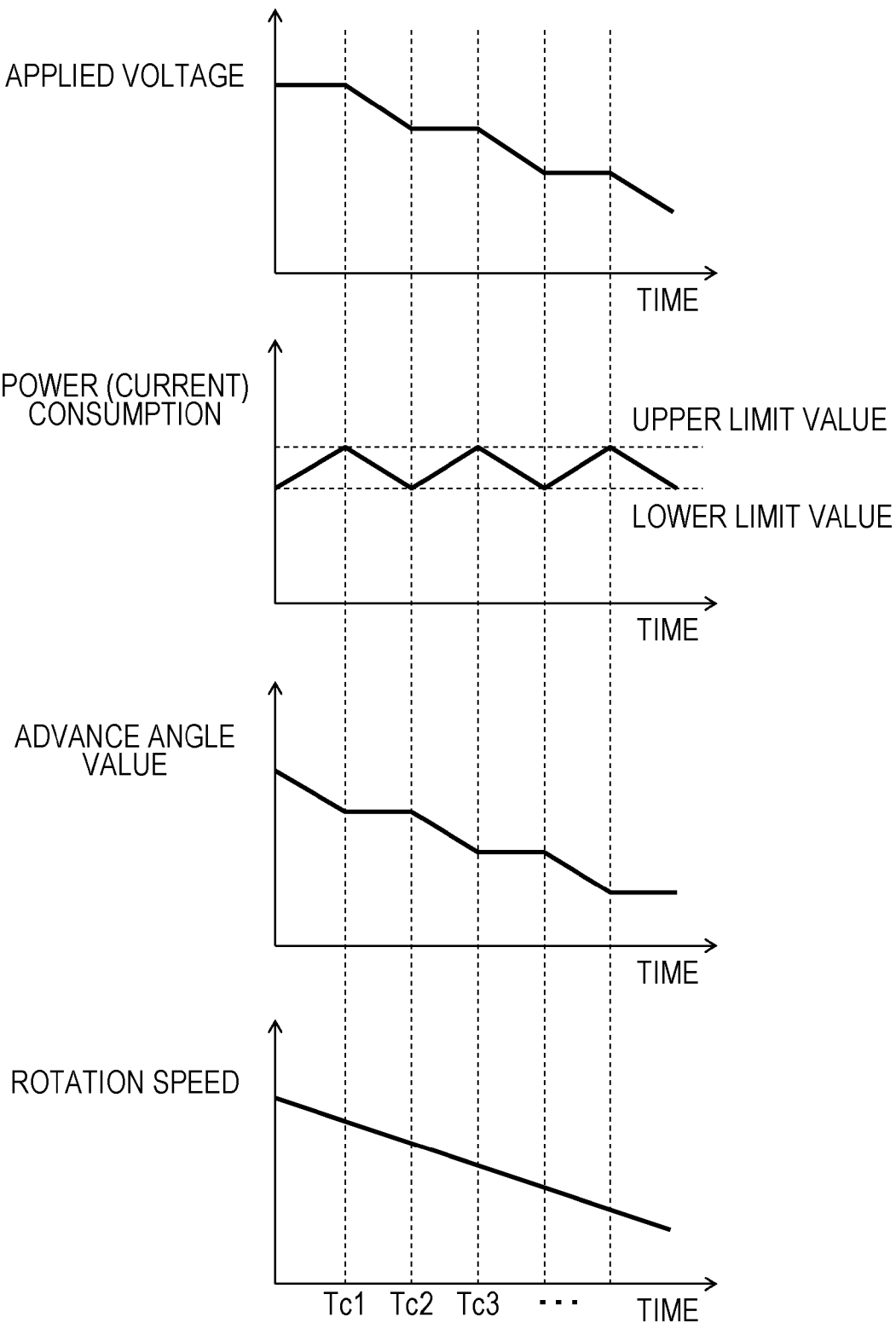
FIG. 13 is a diagram illustrating changes in individual parameters for the control device according to the second embodiment over time during a deceleration period.

The lower limit value of power consumption is determined based on the switching interval of the control mode. If the switching interval is short, the difference between the upper limit value and lower limit value of power consumption can be reduced, and power consumption can be kept at a value that is near the upper limit value. If the switching interval is long, the difference between the upper limit value and lower limit value of power consumption may be increased to set the acceleration caused by the changing of the advance angle and the applied voltage to a value in a controllable range. During deceleration, a large change in advance angle may cause power consumption to exceed the upper limit value. FIG. 13 illustrates changes in the individual parameters during deceleration according to this embodiment.

This embodiment provides a method for implementing speed control while switching between the voltage control mode in which the applied voltage is changed with the advance angle kept constant and the advance angle control mode in which the advance angle is changed with the applied voltage kept constant. Here, the control in which the advance angle is held constant includes the case where the advance angle is changed in a range within which power consumption does not exceed the upper limit value or the lower limit value. Furthermore, the control in which the voltage is held constant includes the case where the voltage is changed in a range within which power consumption does not exceed the upper limit value or the lower limit value.

Third Embodiment

A description will now be given of a method for reducing variations in the rotation speed of the motor 104 by switching between the advance angle control mode and the voltage control mode in accordance with the advance angle.

Figure 14:
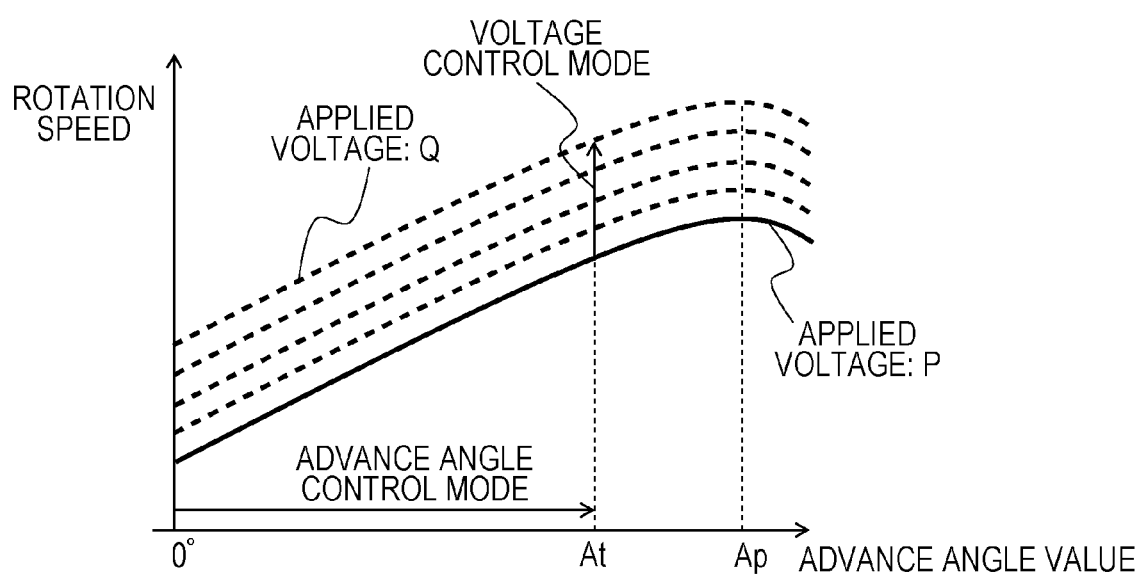
FIG. 14 is a characteristic diagram illustrating the relationship between advance angle and rotation speed in a control device according to a third embodiment.

FIG. 14 illustrates a relationship between the advance angle and the rotation speed of the motor 104 and a relationship between the value of the applied voltage and the rotation speed of the motor 104. The rotation speed of the motor 104 is the highest when the advance angle is 90°. When the advance angle approaches 90°, the speed of the motor 104 does not change at a constant rate with respect to the change in the advance angle. When the advance angle is kept constant, however, the value of the applied voltage is in proportion to the rotation speed of the motor 104. Accordingly, if the advance angle is smaller than a predetermined value At, the motor 104 is driven in the advance angle control mode, whereas if the advance angle is greater than or equal to the predetermined value At and the changing of the applied voltage is possible, the speed control of the motor 104 is performed using the voltage control mode.

Figure 15:
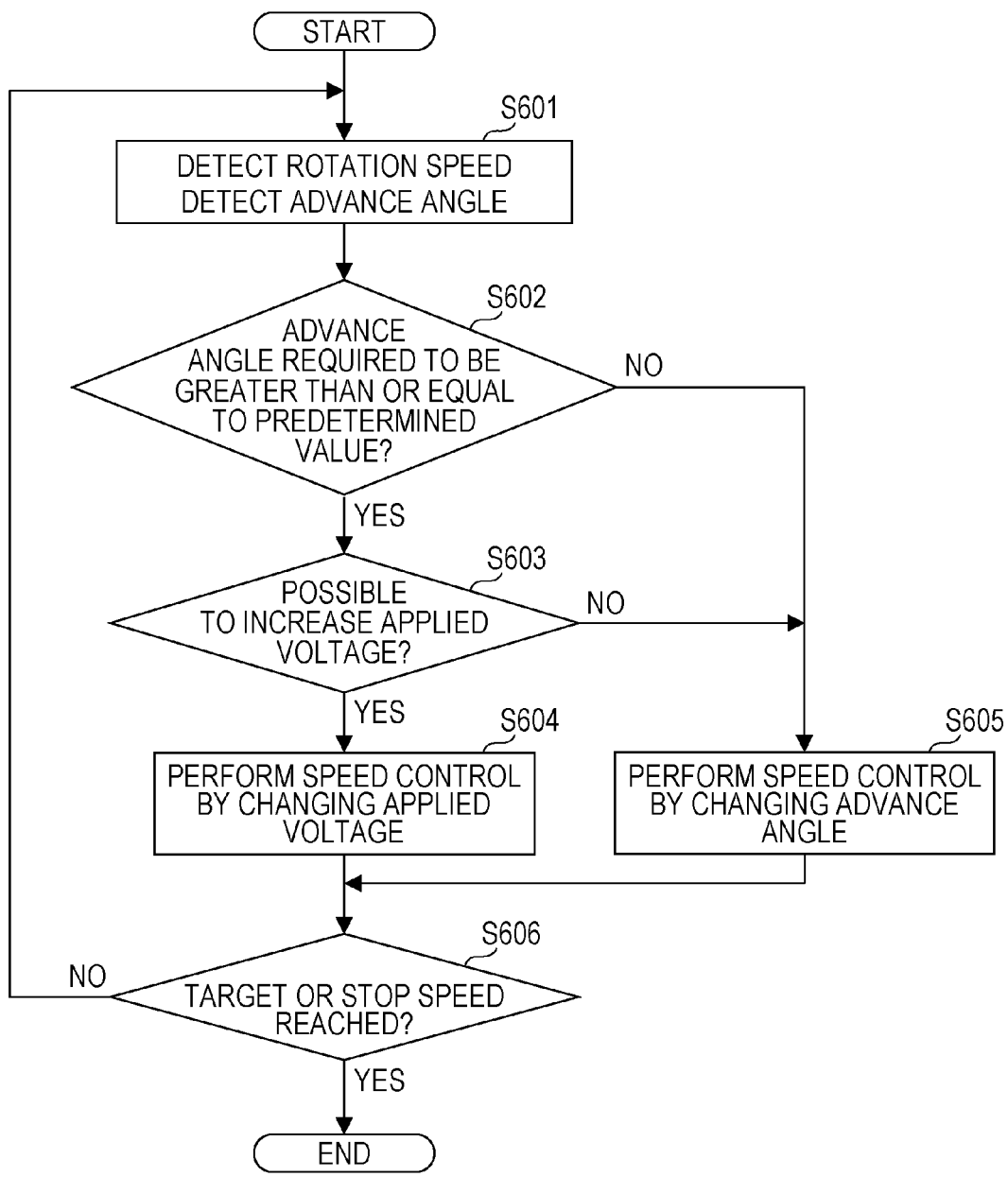
FIG. 15 is a flowchart illustrating speed control for the control device according to the third embodiment, in which an advance angle control mode and a voltage control mode are used in combination.

A flowchart of the operation illustrated in FIG. 14 is illustrated in FIG. 15. In FIG. 15, "S" stands for "step", and the flowchart illustrated in FIG. 15 may be implemented as a control program for allowing a computer to achieve the function of each step. The steps are executed by the lens control microcomputer 109 unless otherwise specified. The control flow illustrated in FIG. 15 is executed by causing the lens control microcomputer 109 to read a control program stored in the lens control microcomputer 109.

First, in S601, the rotation speed of the motor 104 is detected based on the output of the encoder. At the same time, the advance angle at which the rotation speed of the motor 104 is detected is also detectable. In S602, the value of the advance angle is detected, and it is determined whether or not it is necessary to set an advance angle greater than or equal to the value At in order to implement the speed control of the motor 104. If it is necessary to set an advance angle greater than or equal to the value At, the process proceeds to S603. If it is necessary to set an advance angle less than the value At, the process proceeds to S605. In S605, speed control is performed by changing the advance angle.

In S603, it is determined whether or not the changing of the applied voltage is possible. As described above with reference to FIG. 8, information concerning power consumption may be obtained by actually measuring voltage or current. However, for an implementation of simple circuitry, the fact that the rotation speed of the motor 104 is substantially proportional to power consumption may be utilized and power consumption may be estimated from the detected rotation speed of the motor 104. Instead of power consumption, the detected rotation speed of the motor 104 may be used to determine whether or not the changing of the applied voltage is possible.

If the changing of the applied voltage is not possible, the process proceeds to S605. Since there is a possibility that the motor 104 will not be able to be accelerated even if the advance angle is changed, it is necessary to control the advance angle to be not greater than or equal to the value Ap. If the changing of the applied voltage is possible, the process proceeds to S604. In S604, speed control is performed by changing the applied voltage to the motor 104 while fixing the advance angle to the value At. In FIG. 14, the voltage is continuously changed from the applied voltage P to the applied voltage Q, thereby providing speed control of the motor 104. In this case, control is performed so that the acceleration in the advance angle control mode and the acceleration in the voltage control mode have substantially the same value. Accordingly, acceleration is maintained substantially constant, achieving smooth speed control.

In the foregoing embodiments of the present invention, an optical apparatus has been described in the context of a configuration in which a lens apparatus and a camera apparatus on which the lens apparatus is detachably mounted are combined. In other embodiments, the present invention may also provide a lens-equipped camera apparatus, a video camera, an electron microscope, and the like.

While some exemplary embodiments of the present invention have been described, the present invention is not limited to these embodiments, and a variety of modifications and changes can be made without departing from the scope of the invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-150765, filed Jul. 19, 2013, which is hereby incorporated by reference herein in its entirety.

What is claimed is:

1. A stepping motor control device for controlling a stepping motor, comprising:
   a position detection sensor configured to detect a rotation position of the stepping motor;
   a voltage controller configured to apply a voltage to the stepping motor to drive the stepping motor;
   an advance angle controller configured to control an advance angle, the advance angle being a phase difference between an excitation current applied to a coil of the stepping motor and a rotation position of the stepping motor; and a speed controller configured to control a drive speed of the stepping motor, wherein the speed controller is configured to control the drive speed using first acceleration control in which the advance angle is increased by the advance angle controller while voltage is held constant by the voltage controller, and using second acceleration control in which voltage is increased by the voltage controller and the advance angle is reduced by the advance angle controller with the increase in the voltage, wherein the speed controller is configured to control an amount of change of the advance angle in the second acceleration control so as to cancel changes in a rotation speed of the stepping motor which are caused by a change of the voltage.

2. The stepping motor control device according to claim 1, wherein the speed controller is configured to control the drive speed so that power consumption of the stepping motor does not exceed a predetermined upper limit value.

3. The stepping motor control device according to claim 2, further comprising:

a storage unit configured to store data indicating a relationship between the drive speed and the power consumption, wherein the power consumption is detected based on the data and the drive speed.

4. The stepping motor control device according to claim 2, wherein the power consumption is determined using the drive speed of the stepping motor and a value of the voltage.

5. The stepping motor control device according to claim 1, wherein the voltage controller is configured to change the voltage by changing a duty ratio of the voltage.

6. A stepping motor control device for controlling a stepping motor, comprising:

a position detection sensor configured to detect a rotation position of the stepping motor;

a voltage controller configured to apply a voltage to the stepping motor to drive the stepping motor;

an advance angle controller configured to control an advance angle, the advance angle being a phase difference between an excitation current applied to a coil of the stepping motor and a rotation position of the stepping motor; and a speed controller configured to control a drive speed of the stepping motor, wherein the speed controller is configured to control the drive speed using first deceleration control in which the advance angle is reduced by the advance angle controller while voltage is held constant by the voltage controller, and using second deceleration control in which voltage is reduced by the voltage controller and the advance angle is increased by the advance angle controller with the reduction in the voltage, wherein the speed controller is configured to control an amount of change of the advance angle in the second deceleration control so as to cancel the changes in a rotation speed of the stepping motor which are caused by a change of the voltage.

7. The stepping motor control device according to claim 6, wherein the speed controller is configured to control the drive speed so that power consumption of the stepping motor does not exceed a predetermined upper limit value.

8. The stepping motor control device according to claim 7, further comprising:

a storage unit configured to store data indicating a relationship between the drive speed and the power consumption, wherein the power consumption is detected based on the data and the drive speed.

9. The stepping motor control device according to claim 7, wherein the power consumption is determined using the drive speed of the stepping motor and a value of the voltage.

10. The stepping motor control device according to claim 6, wherein the voltage controller is configured to change the voltage by changing a duty ratio of the voltage.

11. An optical apparatus comprising:

a stepping motor; and a stepping motor control device for controlling the stepping motor, wherein the stepping motor control device includes a position detection sensor configured to detect a rotation position of the stepping motor, a voltage controller configured to apply a voltage to the stepping motor to drive the stepping motor, an advance angle controller configured to control an advance angle, the advance angle being a phase difference between an excitation current applied to a coil of the stepping motor and a rotation position of the stepping motor, and a speed controller configured to control a drive speed of the stepping motor, and wherein the speed controller is configured to control the drive speed using first acceleration control in which the advance angle is increased by the advance angle controller while voltage is held constant by the voltage controller, and using second acceleration control in which voltage is increased by the voltage controller and the advance angle is reduced by the advance angle controller with the increase in the voltage, wherein the speed controller is configured to control an amount of change of the advance angle in the second acceleration control so as to cancel changes in a rotation speed of the stepping motor which are caused by a change of the voltage.

12. An optical apparatus comprising:

a stepping motor; and a stepping motor control device for controlling the stepping motor, wherein the stepping motor control device includes a position detection sensor configured to detect a rotation position of the stepping motor, a voltage controller configured to apply a voltage to the stepping motor to drive the stepping motor, an advance angle controller configured to control an advance angle, the advance angle being a phase difference between an excitation current applied to a coil of the stepping motor and a rotation position of the stepping motor, and a speed controller configured to control a drive speed of the stepping motor, and wherein the speed controller is configured to control the drive speed using first deceleration control in which the advance angle is reduced by the advance angle controller while voltage is held constant by the voltage controller, and using second deceleration control in which voltage is reduced by the voltage controller and the advance angle is increased by the advance angle controller with the reduction in the voltage, wherein the speed controller is configured to control an amount of change of the advance angle in the second deceleration control so as to cancel the changes in a rotation speed of the stepping motor which are caused by a change of the voltage.

13. A stepping motor control method for controlling a drive speed of a stepping motor by controlling a voltage applied to the stepping motor and an advance angle, the advance angle being a phase difference between an excitation current applied to a coil of the stepping motor and a rotation position of the stepping motor, comprising:

a first accelerating step of holding the voltage constant and increasing the advance angle; and a second accelerating step of increasing the voltage and reducing the advance angle, wherein an amount of change of the advance angle is controlled in the second accelerating step so as to cancel the changes in a rotation speed of the stepping motor which are caused by a change of the voltage.

14. The stepping motor control method according to claim 13, wherein in the first accelerating step and the second accelerating step, the drive speed is controlled so that power consumption of the stepping motor does not exceed a predetermined upper limit value.

15. A non-transitory computer readable recording medium storing a program that, when executed by a stepping motor control device, causes the stepping motor control device to perform a method according to claim 13.

16. A stepping motor control method for controlling a drive speed of a stepping motor by controlling a voltage applied to the stepping motor and an advance angle, the advance angle being a phase difference between an excitation current applied to a coil of the stepping motor and a rotation position of the stepping motor, comprising:

a first decelerating step of holding the voltage constant and reducing the advance angle; and a second decelerating step of reducing the voltage and increasing the advance angle, wherein an amount of change of the advance angle is controlled in the second decelerating step so as to cancel the changes in a rotation speed of the stepping motor which are caused by a change of the voltage.

17. The stepping motor control method according to claim 16, wherein in the first decelerating step and the second decelerating step, the drive speed is controlled so that power consumption of the stepping motor does not exceed a predetermined upper limit value.

18. A non-transitory computer readable recording medium storing a program that, when executed by a stepping motor control device, causes the stepping motor control device to perform a method according to claim 16.

* * * * *